No. 769,270. PATENTED SEPT. 6, 1904.
W. C. NORCROSS.
METAL MOLD.
APPLICATION FILED JULY 11, 1903.
NO MODEL. 3 SHEETS—SHEET 1.
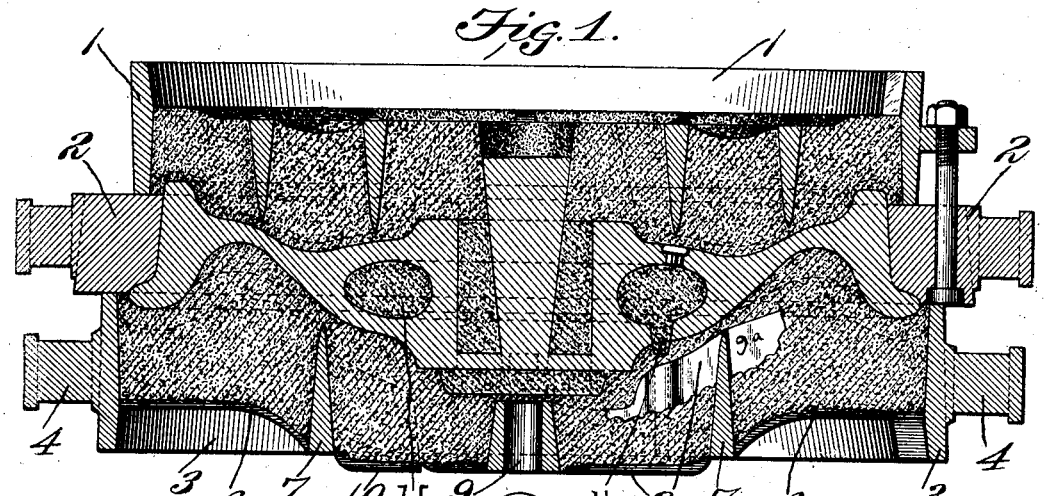
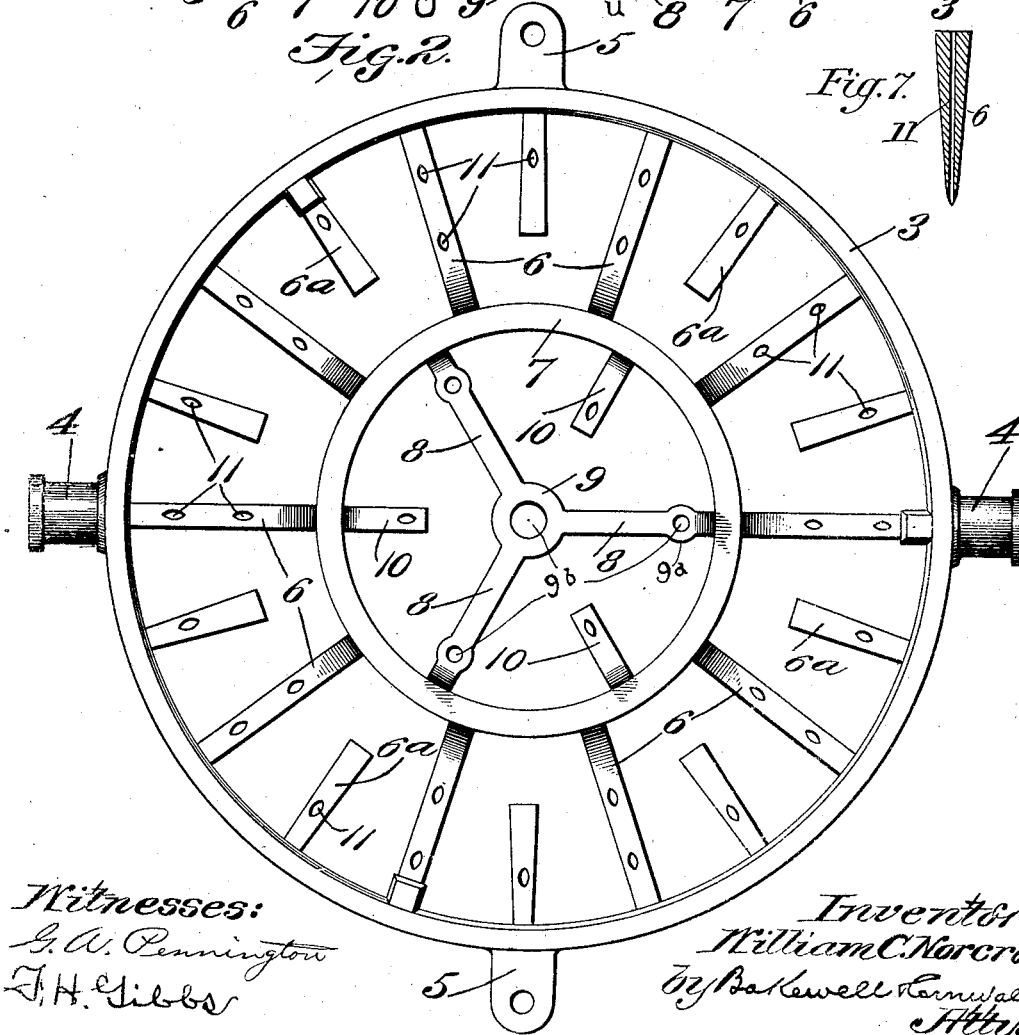
Witnesses:
G. A. Pennington
F. H. Gibbs
Inventor:
William C. Norcross,
By Bakewell Cornwall
Attys.

No. 769,270. PATENTED SEPT. 6, 1904.
W. C. NORCROSS.
METAL MOLD.
APPLICATION FILED JULY 11, 1903.
NO MODEL. 3 SHEETS—SHEET 2.
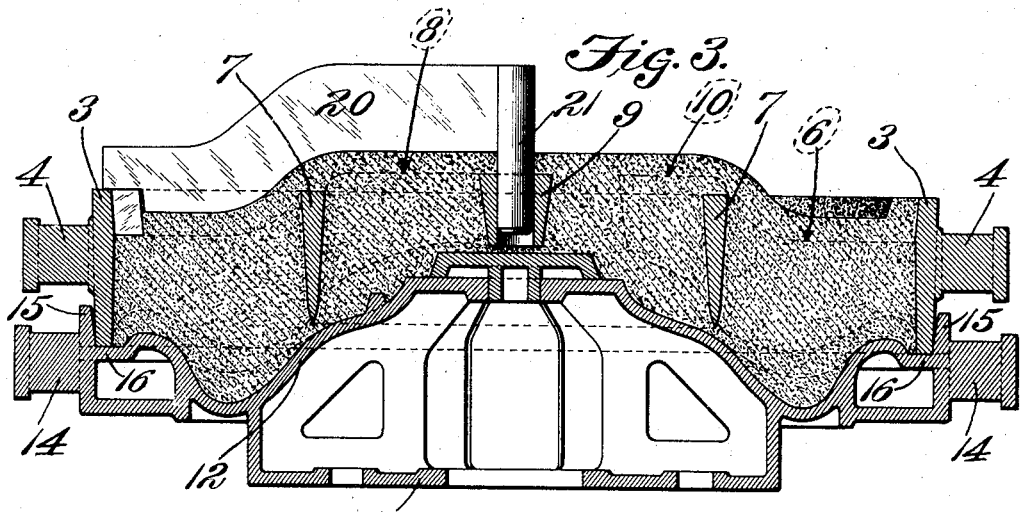
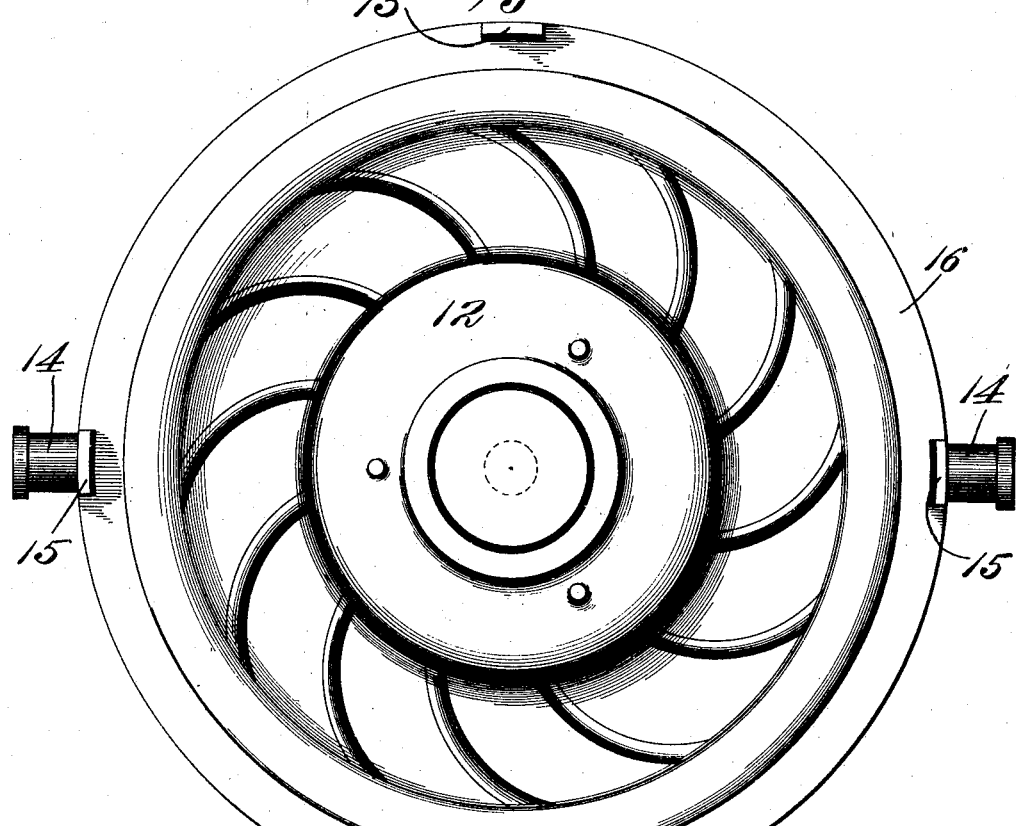
Witnesses:
G. A. Pennington
F. H. Gibbs
Inventor:
William C. Norcross,
by Bakewell & Cornwall
Attys.

No. 769,270. PATENTED SEPT. 6, 1904.
W. C. NORCROSS.
METAL MOLD.
APPLICATION FILED JULY 11, 1903.
NO MODEL. 3 SHEETS—SHEET 3.
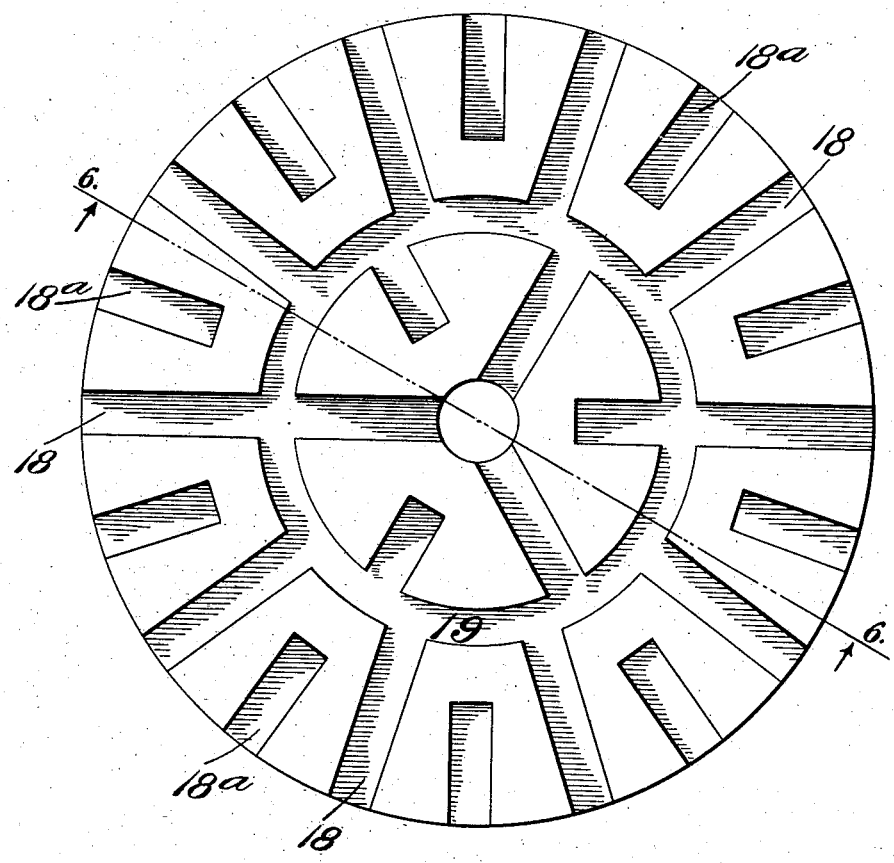
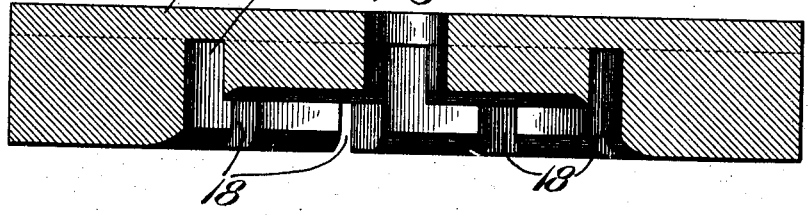
Witnesses:
G. A. Pennington
F. H. Gibbs
Inventor:
William C. Norcross,
by Bakewell & Cornwall
Attys.

No. 769,270.

Patented September 6, 1904.

UNITED STATES PATENT OFFICE.

WILLIAM C. NORCROSS, OF TERRE HAUTE, INDIANA, ASSIGNOR TO AMERICAN CAR & FOUNDRY COMPANY, OF ST. LOUIS, MISSOURI, A CORPORATION OF NEW JERSEY.

METAL-MOLD.

SPECIFICATION forming part of Letters Patent No. 769,270, dated September 6, 1904.

Application filed July 11, 1903. Serial No. 165,141. (No model.)

*To all whom it may concern:*

Be it known that I, WILLIAM C. NORCROSS, a citizen of the United States, residing at Terre Haute, Indiana, have invented a certain new and useful Improvement in Metal-Molds, of which the following is a full, clear, and exact description, such as will enable others skilled in the art to which it appertains to make and use the same, reference being had to the accompanying drawings, forming part of this specification, in which—

Figure 1 is a sectional view through a complete molding-flask embodying my invention. Fig. 2 is an inverted plan view of the drag. Fig. 3 is an inverted sectional view showing the drag and drag-pattern in position filled with sand. Fig. 4 is a face view of the drag-pattern. Fig. 5 is a face view of the drag-follower. Fig. 6 is a sectional view thereof on line 6 6 of Fig. 5, and Fig. 7 is an enlarged sectional view through a portion of one of the cope-bars.

This invention relates to new and useful improvements in drag for molding used in the molding of car-wheels, the object being to provide a drag which may be used in conjunction with the power molding-machine and which will be so perfectly vented as to permit the casting therein of uniformly-perfect wheels.

The invention consists in certain features of novelty relating thereto, all as hereinafter more fully described, and particularly pointed out in the claims.

In the annexed drawings, 1 is a cope which forms the subject-matter of an application, Serial No. 165,143, filed July 11, 1903, being of even date herewith, which is more fully described in said application and claimed therein.

2 is a chill-ring connected with the cope.

3 is the drag which forms the subject-matter of this application, the several parts of the flask being arranged as shown in Fig. 1 for the purpose of forming therein the cast-metal car-wheel as shown in that figure. The drag, being constructed for use in casting car-wheels, is preferably of circular form, as best shown in Fig. 2, wherein the outer shell conforms to the contour of the tread of the wheel. The drag is preferably provided with trunnions 4, by means of which it is lifted to position on the power molding apparatus and therefrom for use when required. Lugs 5 are also provided for connecting therewith other parts of the molding-flask when desired.

In casting car-wheels great difficulty has been heretofore encountered in securing perfect castings, owing, primarily, to defects in the construction of the several parts of the molding-flask and resulting in imperfect venting thereof, which imperfect venting caused a large percentage of defective castings and numerous explosions of flasks in the foundries. To overcome the difficulties heretofore encountered in that respect and for other purposes, the drag is provided with inwardly-extended radial arms 6, which arms, as shown in the sectional views in Figs. 1 and 3, are elongated and tapering from top to bottom, the wider portion of said arms 6 being at the bottom when the drag is in position ready for use. The arms 6 extend, preferably, to an inner ring 7, preferably concentric with the outer shell of the drag, ring 7 being provided with a plurality of arms 8, extending from thence to a central hub 9, as best shown in Fig. 2, and also with the arms 10, which may or may not be in alinement with the arm 6, before referred to. Extending vertically through the arms 6 are numerous vent-openings 11, which vent-openings are provided to carry off surplus gases generated in the flask when the molten metal is poured therein. To provide for perfect venting of the flask, these vent-openings are freely distributed throughout the interior portions of the structure and may be located in the arms 6, the short arms 6ª, the ring 7, or in any or all of the interior portions of the general skeleton frame comprising the interior of the drag; but in practice said vent-openings are located, as best shown in Fig. 2, in the several arms projecting inwardly from the exterior shell 3 of the drag.

The form of the interior skeleton as to the number of arms or their shape in cross-section or line of projection is substantially immaterial, provided they have the necessary number of vent-openings 11; but as this drag is to be used in conjunction with a power molding-machine, wherein the sand is pressed by power-actuated mechanism between a drag-pattern and a follower, it is preferred that the skeleton interior of the drag shall be provided with connected arms or means which shall be substantially wedge-shaped in cross-section through the various portions of the skeleton, the object of this wedge shape being to provide a more perfect support for the sand therein after it has been pressed in the machine. An additional advantage in the wedge-shaped skeleton members is the ease with which sand may be pressed into contact with the pattern so as to form a matrix the shell of which will be of substantially uniform density throughout. This cannot be readily secured if the skeleton members are otherwise than wedge-shaped in section, as in such constructions the sand will not be of the same density below the arms of the skeleton as between them and imperfect castings may result. When the skeleton is formed wedge-shaped in cross-section, a bottom board or support for the sand is not necessary in the subsequent handling of the drag after the sand is pressed therein.

In Fig. 3 the drag is shown as mounted in position on a drag-pattern 12, provided with the base 13, lifting-trunnions 14, guide-lugs 15, and supporting-shoulder 16, the remaining portion of the drag-pattern being of such contour as may be necessary to form the matrix for casting the wheel.

In Figs. 5 and 6 are illustrated a form of follower to be used in conjunction with the drag and drag-pattern of Fig. 3. This follower comprises a base member 17, provided with radial channels 18 and $18^a$, corresponding, respectively, with the line of projection of the arms 6 $6^a$ of the drag, and concentric channel 19, corresponding with the contour of the concentric ring 7, and other channels corresponding to the various elements of the skeleton of the drag. When the drag is filled with sand, it is in an inverted position, as shown in Fig. 3, wherein the sand is supported by the drag-pattern, after which the scraper 20, provided with the post 21, is placed in position thereon, the post 21 fitting in the hub portion 9 of the drag, so that the scraper may be rotated thereon to remove surplus sand from the drag, after which the follower of Figs. 5 and 6 is placed in position upon the sand, the channels in the face of said follower corresponding with the interiorly-projecting members of the drag-skeleton. The drag-pattern is supported in position, preferably, upon a vertically-movable plunger, while some means is provided for preventing upward movement of the follower. The plunger is then elevated, forcing the drag-pattern vertically upwardly against the sand and compressing the same, so as to form therein one portion of the matrix to be used in the subsequent casting of car-wheels. An apparatus such as that shown in Letters Patent No. 672,778 to Joseph G. Johnson may be used, if desired. When the pressure is being applied, the follower of Figs. 5 and 6 will adjust itself vertically thereon, the said channels being of such depth as to permit of a sufficient vertical movement of the parts as will be necessary to thoroughly press the sand to hold it firmly in the drag during the subsequent manipulations thereof. When the drag is inverted from the position of Fig. 3 and placed upon the floor for use, the cope is placed thereon. The molten metal is then poured into the flask, and owing to the thin shell of sand, which in practice is a mere facing between the inner edges of the skeleton members and the interior of the mold, the generation of gases in the matrix will be relieved through the vertically-disposed vent-openings, so that perfect castings will result.

When the drag side of the mold has been pressed, the pattern removed, and the mold is pointed up, the concentric core U is placed in position to form a concentric opening around the hub of the wheel. The concentric cores have projections or feet $u$ on their under side, which feet rest vertically above the small hubs $9^a$, which hubs are provided with vertical openings $9^b$, extending therethrough, through which openings $9^b$ vent-gases of the ring-core are taken off, while the vent-gases from the central hub-core are taken off through a corresponding opening $9^b$ in the central hub.

It is obvious that the several members of the flask may be either circular, square, rectangular, or any other convenient shape, according to the purposes for which they are to be used, and that any convenient means may be substituted for the sweep 20 herewith shown for removing the surplus sand.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. A drag for molding, comprising a pair of concentric rings, radial arms on one of the rings and connected to the other ring, arms having free ends and carried by one of the rings, said arms alternating with the first-named arms, inwardly-projecting arms carried by the smaller ring and having free ends, and a spider within the smaller ring, the arms of which alternate with the arms within the smaller ring, all of said arms having vent-openings; substantially as described.

2. In a mold, the combination with a flask, of a matrix, a drag below the matrix and comprising a perforated skeleton structure, a cope above the matrix and comprising a perforated skeleton structure, the skeleton members of the drag and cope being wedge shape throughout, the opening in the cope being disposed to assist the gases in passing from the top of the matrix and the openings in the drag being disposed to assist in taking off the gases from the floor of the matrix, the narrow portions of the respective wedge-shape members of the cope and drag being disposed toward each other; substantially as described.

In testimony whereof I hereunto affix my signature, in the presence of two witnesses, this 6th day of July, 1903.

WILLIAM C. NORCROSS.

Witnesses:
 FREDERICK G. SCHAAL,
 I. F. VALENTINE.